United States Patent
West (10) Patent No.: US 10,460,335 B2
(45) Date of Patent: Oct. 29, 2019

(54) GEO-FILTERING CONSUMERS

(71) Applicant: Comenity LLC, Columbus, OH (US)

(72) Inventor: Randy West, Pickerington, OH (US)

(73) Assignee: Comenity LLC, Columbus, OH (US)

( * ) Notice: Subject to any disclaimer, the term of this patent is extended or adjusted under 35 U.S.C. 154(b) by 754 days.

(21) Appl. No.: 14/643,798

(22) Filed: Mar. 10, 2015

(65) Prior Publication Data
US 2016/0267508 A1 Sep. 15, 2016

(51) Int. Cl.
*G06Q 30/02* (2012.01)
*H04W 4/021* (2018.01)

(52) U.S. Cl.
CPC ........ *G06Q 30/0205* (2013.01); *H04W 4/021* (2013.01)

(58) Field of Classification Search
CPC .......................... G06Q 30/0205; H04W 4/021
USPC ....... 705/7.34, 7.36; 235/383, 380; 709/224; 715/771
See application file for complete search history.

(56) References Cited

U.S. PATENT DOCUMENTS

| | | | | |
|---|---|---|---|---|
| 6,158,657 A * | 12/2000 | Hall, III | ............... | G06Q 20/341 235/379 |
| 8,584,940 B2 * | 11/2013 | Mesaros | ............ | G06Q 30/0207 235/383 |
| 2006/0106930 A1 * | 5/2006 | Shaffer | ................... | H04L 67/18 709/224 |
| 2011/0054981 A1 * | 3/2011 | Faith | ...................... | G06Q 30/02 705/7.36 |
| 2013/0091452 A1 * | 4/2013 | Sorden | .................... | G06F 3/048 715/771 |
| 2014/0070001 A1 * | 3/2014 | Sanchez | ................. | G06Q 20/40 235/380 |

FOREIGN PATENT DOCUMENTS

KR 20080068612 A * 7/2008

OTHER PUBLICATIONS

Linda Musthaler, Next generation Geo-IP filtering can be fine tuned to vastly reduce unwanted and malicious traffic, 2014 (Year: 2014).*

* cited by examiner

*Primary Examiner* — Tarek Elchanti (57) ABSTRACT

A method for geo-filtering consumers for presenting credit card offers is described, and includes: determining a brand of interest for which one or more credit card offers will be communicated to the identified customer; and comparing a brand policy of the brand of interest, the stored customer information relating to the identified customer, the stored location information relating to the determined location of the mobile device and credit offer conversion factors, wherein the credit offer conversion factors assign values to combinations of subsets of information of at least any of the following types of information: the brand policy; the stored customer information relating to the identified customer; and the stored location information relating to the determined location of the mobile device; and generating a credit card offer to be transmitted to the identified customer.

14 Claims, 5 Drawing Sheets

GEO-FILTERING CONSUMERS

BACKGROUND

Conventional in-store marketing strategies for retail stores generally focus upon all consumers who enter the retail store without discretion. For example, when a consumer walks into a retail store, he is approached by a sales associate who pitches an offer that he hopes inspires the consumer to make a purchase. In another example, the consumer notices advertisements in the retail store that present a specific promotional deal. However, the sales associate usually does not know the consumer's shopping habits and/or preferences. Additionally, the retail store may offer the consumer a credit card with a specific credit limit that may be too high is some cases and too low in other cases. The consumer may spend time on-line or at the point of service (e.g., cash register being attended by a sales associate) to learn whether his credit card application (and limit) has been accepted or declined. Thus, much time and marketing resources for a retail store are wasted in making sales pitches that are possibly irrelevant to a consumer browsing the store inventory. Further, the consumer's time is wasted during the waiting process in which he is learning if his credit application has been accepted or declined. Thus, limitations exist with regard to conventional marketing strategies that focus on consumers who are physically present within a retail store.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

SUMMARY

The following is a summary of at least one embodiment of the present technology:

An article of manufacture, which includes a computer readable medium having stored therein a computer program for geo-filtering a consumer, the computer program including: a first code segment which, when executed on a computer, accesses mobile device location information regarding a mobile device at a location to achieve accessed mobile device location information; a second code segment which, when executed on the computer, accesses mobile device identification information regarding the mobile device at the location to achieve accessed mobile device identification information; a third code segment which, when executed on the computer, based on the accessed mobile device location information, and the accessed mobile device identification information, determines the location of the mobile device to achieve a determined location; a fourth code segment which, when executed on the computer, identifies a customer relating to the accessed mobile device identification information to achieve an identified customer; a fifth code segment which, when executed on the computer, based on the determined location of the mobile device, stored location information, the identified customer, stored customer information relating to the identified customer, determines a brand of interest for which one or more credit offers will be communicated to the identified customer; a sixth code segment which, when executed on the computer, compares a brand policy of the brand of interest, the stored customer information relating to the identified customer, the stored location information relating to the determined location of the mobile device and credit offer conversion factors, wherein the credit offer conversion factors assign values to combinations of subsets of information of at least any of the following types of information: the brand policy; the stored customer information relating to the identified customer; and the stored location information relating to the location of the mobile device; and a seventh code segment which, when executed on the computer, based on the comparing, generates a credit card offer to be transmitted to the identified customer.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accessing," "determining", "identifying", "comparing", "generating", "sending", "updating", or the like, often refer to the actions and processes of an electronic computing device (or portion thereof), module or system, such as, but not limited to, a geo-filtering system and a geo-filtering module (See FIGS. 1, 2 and 3), unless noted otherwise. The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Embodiments and Discussion

Conventional in-store marketing strategies for retail stores generally focus upon all consumers who enter the retail store without discretion. For example, when a consumer walks into a retail store, he is approached by a sales associate who pitches an offer which he hopes inspires the consumer to make a purchase. In another example, the consumer notices advertisements in the retail store that present a specific promotional deal. However, the sales associate usually does not know the consumer's shopping habits and/or preferences. Additionally, the retail store may offer the consumer a credit card with a specific credit limit that may be too high is some cases and too low in other cases. The consumer may spend time on-line or at the point of service (e.g., cash register being attended by a sales associate) to learn whether his credit card application (and limit) has been accepted or declined. Thus, much time and marketing resources for a retail store are wasted in making sales pitches that are possibly irrelevant to a consumer browsing the store inventory. Further, the consumer's time is wasted during the waiting process in which he is learning if his credit application has been accepted or declined. Thus, limitations exist with regard to conventional marketing strategies that focus on consumers who are physically present within a retail store.

Embodiments of the present technology provide a method and system for filtering a consumer(s) for relevancy to a particular business establishment, prior to any credit card offers being communicated to the consumer(s). After a consumer is screened for relevancy to the business establishment, embodiments generate a credit card offer that falls within the policy created by the business establishment for which the credit card offer is presented and that is most likely to appeal to the filtered consumer. Embodiments filter out the consumers (such that the filtered-out consumers do not receive a credit card offer) who are found to fall outside of the business establishment's policy for presenting credit card offers and who are determined to not be likely to purchase and/or use the goods and/or services provided by the business establishment. The determination to present a credit card offer from a particular business establishment and to a particular consumer is based upon gathered information about the consumer and stored information (policies) about various business establishments. This determination is generated by a computer application that either resides at the mobile device of the consumer, at a service (e.g., business that operates at least a portion of the geo-filtering system), or portions of which reside at both the mobile device and the service. The consumers are "filtered" (i.e., filtered-in [determined to be eligible to receive a credit card offer] of filtered-out [determined not to be eligible to receive a credit card offer]) based upon predetermined factors, such as, for example, but not limited to such example, the following predetermined factors (including demographic information): purchasing habits; income; age; gender; determined purchasing preferences; ethnicity; knowledge of languages; disabilities; mobility; home ownership; employment status; current location; relationship with brand(s); educational level; travel history; and family status. It should be noted that any type and amount of "predetermined factors" may be considered for filtering a consumer.

Figure 1:
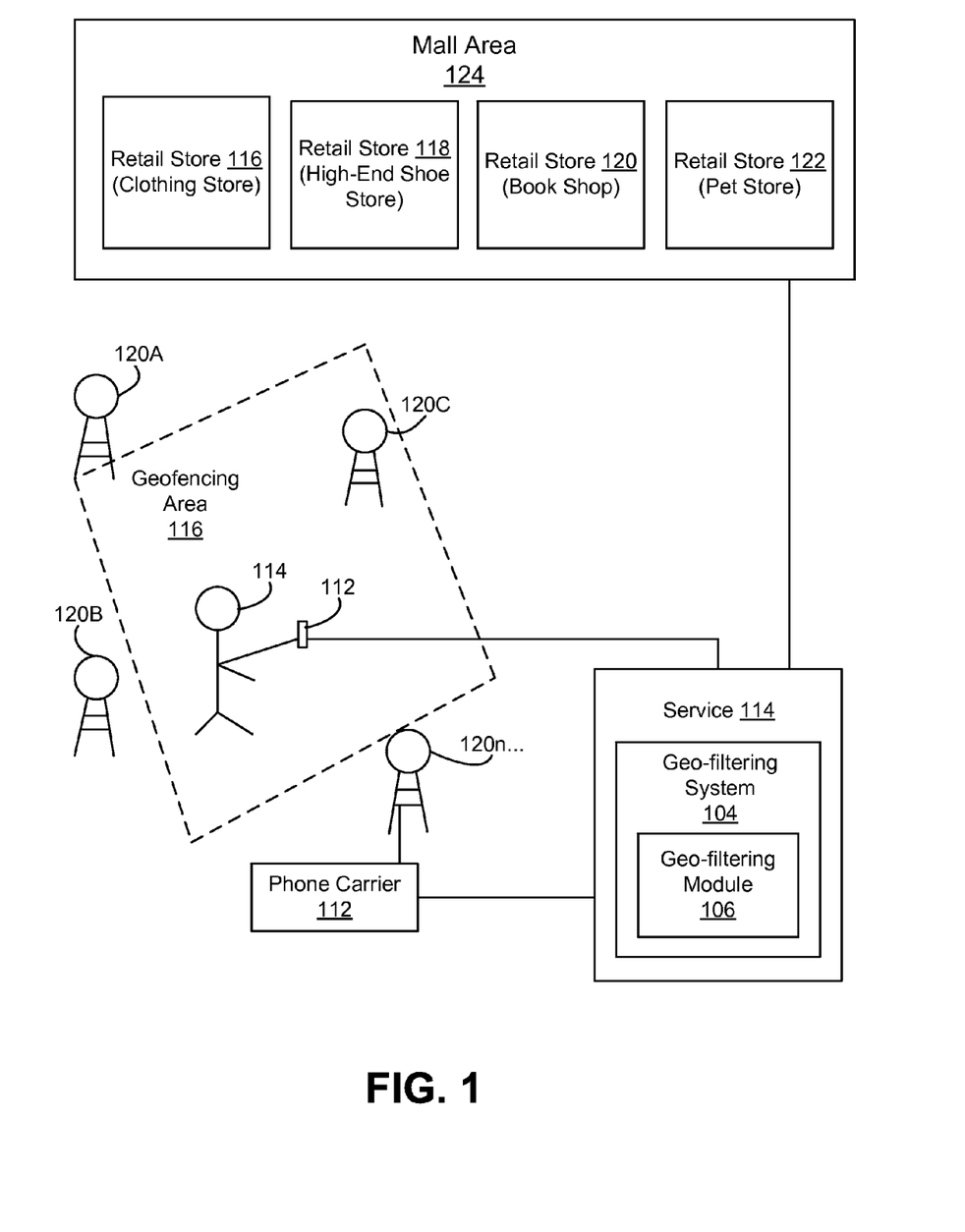
FIG. 1 is a block diagram that illustrates, in conjunction with the description provided herein, a method of filtering consumers to whom credit card offers from business establishments will be provided, in accordance with an embodiment.

The following is a high-level non-limiting example of embodiments involving a geo-filtering system 104 and a geo-filtering module 106. Referring now to FIG. 1, embodiments show a consumer 100 strolling near a string of retail stores, retail stores 116, 118, 120 and 122. The consumer is holding a mobile device 102. The mobile device 102 is communicatively coupled with the phone carrier 112. In one embodiment, the mobile device 102 is communicatively coupled with the service 114. It is assumed that the consumer 100 is the registered owner of the mobile device 102, and is the person whom "opted-in" to receive credit card offers from business establishments. Of note, the business establishments, according to embodiments, may be any type of store that sells and/or offers for free goods and/or services. In one example, the business establishment is a wholesale store offering for sale an array of goods. In another embodiment, the business establishment is a museum offering goods and services both for sale and for free. In yet another embodiment, the business establishment is a baseball stadium, offering goods and services for sale. In yet another embodiment, the business establishment is a retail store, such as a shoe store.

In operation, embodiments determine the location of the mobile device 102 (and of the consumer 100 who is holding the mobile device 102). The location of the mobile device 102, in various embodiments, is determined using any type of location determining technology known in the art. In one embodiment, this determination is executed using geofencing. In another embodiment, this determination is executed using the method and system described in U.S. Patent Provisional Application 62/096,195, entitled, "Geofencing Messaging System", filed Dec. 23, 2014. Thus, regardless of the type of mobile device the consumer is carrying, embodiments are enabled to be executed such that geo-filtered consumers receive credit card offers via mobile devices of the geo-filtered consumers. While embodiments function for any type of mobile device, for the purposes of clarity and brevity within the following discussion of embodiments, the mobile device will variously be referred to as a "mobile phone".

Of note, some embodiments utilize a phone carrier's ability to apply localization technology to determine the physical position of the consumer via determining the position of the consumer's mobile phone. This localization technology that may be used with embodiments is known in the art and includes, but is not limited to, the following techniques: network-based; SIM; WiFi; and a hybrid of the foregoing. Various phone carriers utilize one or more of the foregoing techniques.

FIG. 1 shows the following business establishments: the retail store 116, the retail store 118; the retail store 120; and the retail store 122. In this example, the retail store 116 is a clothing store, the retail store 118 is a high-end shoe store, the retail store 120 is a book shop, and the retail store 122 is a pet store.

As the consumer 100 strolls near the mall area 124 (including retail stores 116, 118, 120 and 122), the geo-filtering system 104 residing on the mobile device 102, in brief and as will be explained in more detail below, determines the exact location of the consumer 100 and determines the consumer's identity. The geo-filtering system 104 compares the determined location and the identified customer with a memory store of information (either located at the mobile device 102 or the service 114). From this comparison, the geo-filtering system 104 determines the credit card offer limit amount, if any, the consumer 100 should receive for any of the retail stores 116, 118, 120 and 122 within the area. The service 114 has already contracted with the retail stores 116, 118, 120 and 122 to offer a potential customer, such as the consumer 100, a credit card offer that complies with that particular business establishment's policies. For example, the retail store 118, a high-end shoe store, has determined the following policy guidelines: a low-income potential customer (determined to have a yearly family income of between $0 and $20,000) may be offered a credit card with a $300 limit; a medium-income potential customer (determined to have a yearly income of between $20,001 and $70,000) may be offered a credit card with a $1,500 limit; and a high-income potential customer (determined to have a yearly income of between $70,001 and above) may be offered a credit card with a $3,500 limit. The retail store 120, the bookshop, on the other hand, has a policy in which all relevant potential customers should be offered a credit card with a credit limit of $500.

As noted, the consumer 100 has already opted-in to the program of receiving potential credit card offers from relevant business establishments. The service 114 has asked and received answers to various questions about the consumer's 100 demographics and other information. Further, the service 114 has also determined important characteristics of each of the business establishments (clients of the service 114) to which characteristics of consumers may be matched. The service 114, according to an internal policy and/or according to a policy determined by the business establishments, determines a match rating score for each of the characteristics of the business establishment with each of the characteristics of the consumers. If a predetermined number of characteristics of a business establishment are found to match (relate to each other in a predetermined way [e.g., a purchasing history of a consumer found to be laden with shoe purchases "matches" a characteristic of a business establishment that is a shoe store- shoes]) characteristics of a consumer's information, then embodiments will generate a credit card offer according to the business establishments predetermined policy regarding credit card offers.

For example, an embodiment according to the example shown in FIG. 1, identifies the consumer 100 as being Anna Early, a female; 45 years old, married, without children, Caucasian, a professor of Russian literature at the local college, a purchasing history that is saturated with shoe purchases and comparatively light on clothing purchases, allergies to dander and mites; overweight relative to the average weight of 45 year old females within the United States; and earns an annual income of $112,000.

An embodiment finds that the characteristic of Anna Early having a purchasing history that is saturated with shoe purchases matches the characteristic of the retail store 118 (shoe store) having shoes for sale. Additionally, an embodiment finds that the characteristic of Anna Early being a Russian literature professor matches the characteristics determined by the retail store 120 (bookshop) to be significant for offering a branded credit card for the bookshop, that of: "education: college or above"; "occupation: teacher"; "language: fluent in a language other than English"; "age: over 38 years". The retail store 120 has contracted with the service 114 that if at least two or more characteristics match with the retail store's 120 outlined characteristics, then the consumer is to be offered a credit card with a $500 limit. An embodiment does not find enough matching characteristics between Anna Early and the retail store 116 (the clothing store) to make a credit card offer. The retail store 116 (the clothing store) has contracted with the service 114 that at least four characteristics must be matched in order that the consumer be offered a credit card with a credit limit, with at least one required characteristic- the consumer's clothing purchase history must represent twenty percent of that consumer's purchasing history. Anna Early's purchasing history does not show that twenty percent of her purchases involve clothing. Therefore, an embodiment does not present a credit card offer on behalf of the retail store 116. Further, the retail store 122 (the pet store) has contracted with the service 114 that if the consumer has allergies to animals, a credit card offer is not to be presented to the consumer. Since Anna Early is allergic to dander and mites, it is determined that Anna Early has allergies to at least some animals. Therefore, an embodiment does not present a credit card offer on behalf of the retail store 122.

Thus, based on comparing the consumer's information and location with the stored information regarding the retail shops in the area (retail stores 116, 118, 120, and 122), embodiments generate the following credit card offers with the following credit card limits to Anna Earl: a credit card for the retail store 118 (the high-end shoe store) with the credit card limit of $3,500; and a credit card for the retail store 120 (the book shop) with a credit limit of $500.

Of significance, the business policies of the business establishments may be stored at the service 114 and/or at the mobile device 102. Additionally, the consumer's information may be stored at the service 114 and/or at the mobile device 102. Further, the location information may be store at the service 114 and/or at the mobile device 102. In this respect, it can be seen that the service, in various embodiments, is communicatively coupled (wirelessly) with the mobile device 102. Further, the service 114, in one embodiment, is communicatively coupled with the business establishments. Information stored at the mobile device 102 and/or the service 114 may be updated automatically and/or manually.

Figure 2:
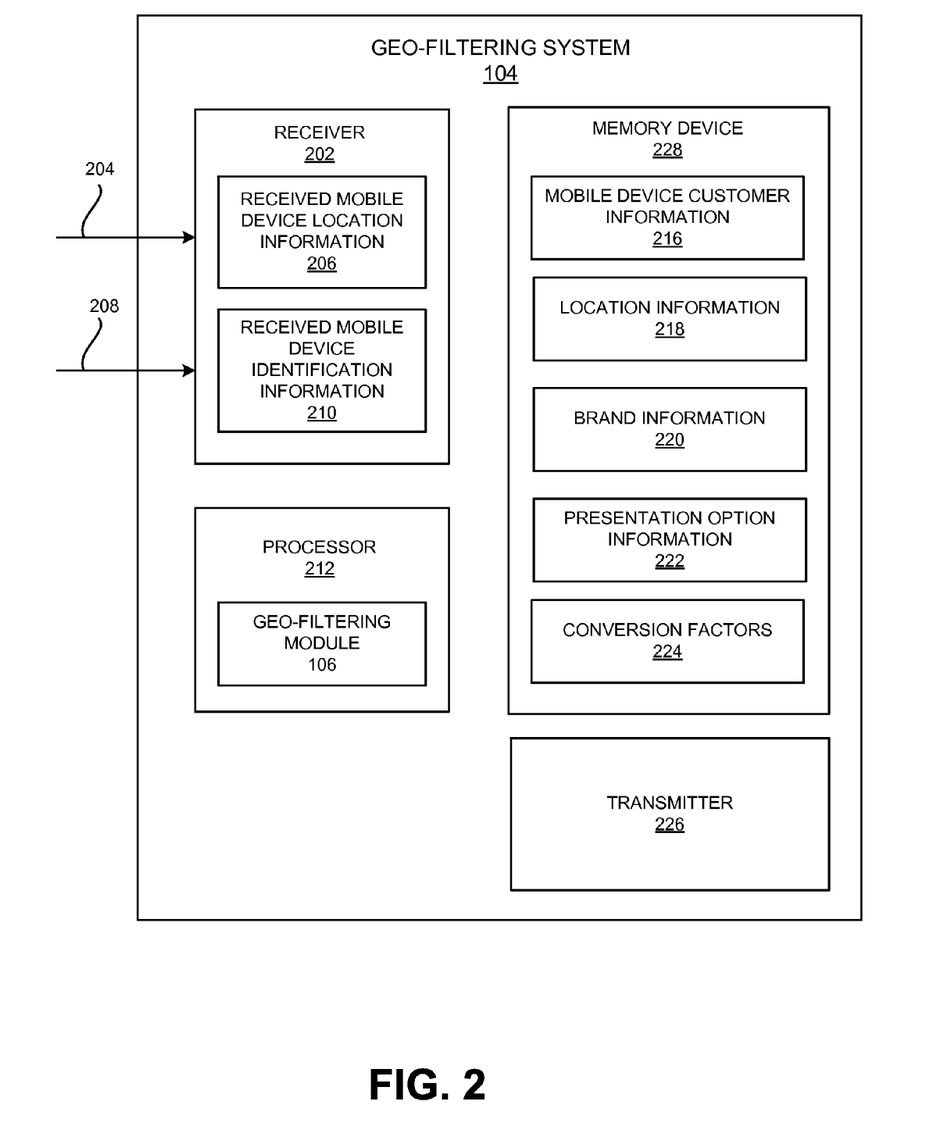
FIG. 2 is a block diagram that illustrates an embodiment of a geo-filtering system, including a geo-filtering module, in accordance with an embodiment.
Figure 3:
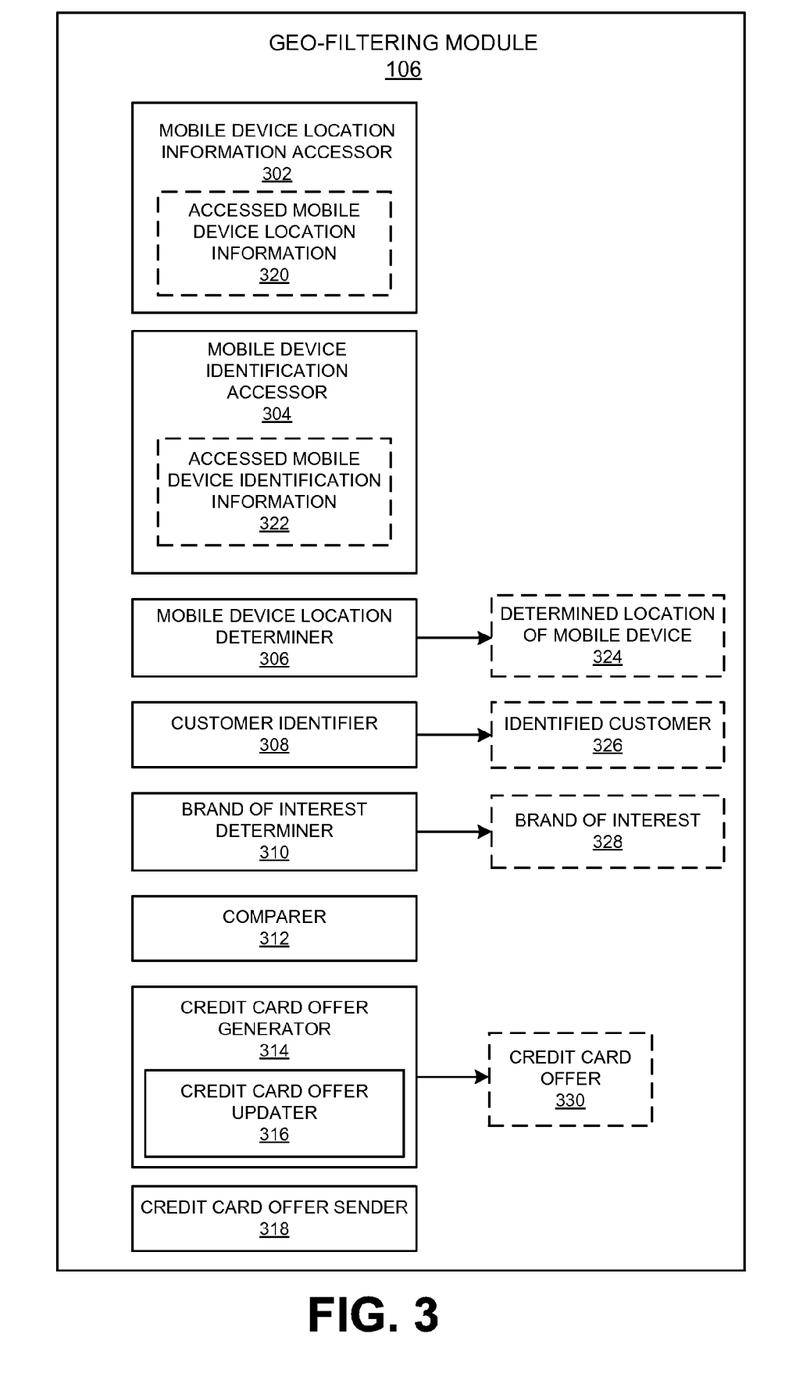
FIG. 3 depicts a geo-filtering module, in accordance with an embodiment.

The following discussion will begin with a description of a geo-filtering system 104 and a geo-filtering module 106 (see FIGS. 2 and 3). The discussion will follow with a description of a method of operation for geo-filtering consumers with reference to FIGS. 1-4. The discussion concludes with a description of an example computer system with which or upon which various embodiments of the present technology may be implemented. (See FIG. 5.)

Geo-filtering System

FIGS. 2 and 3 depict block diagrams that illustrate the geo-filtering system 104 and the geo-filtering module 106, and the hardware and the software involved in the operation of the method for geo-filtering consumers described herein, in accordance with an embodiment. FIG. 2 shows the geo-filtering system 104 that includes the following components coupled with each other: a receiver 202; a processor 212; a memory device 228; and a transmitter 226.

The receiver 202 is configured for receiving mobile device location information 204 and mobile device identification information 208. In one embodiment, the receiver 202 receives the mobile device location information 204 from a phone carrier, such as phone carrier 112. In another embodiment, the receiver 202 receives the mobile device location information 204 from the service 114. In one embodiment, the receiver 202 receives the mobile device identification information 208 from a phone carrier, such as phone carrier 112. In another embodiment, the receiver 202 receives the mobile device identification information 208 from the service 114. Thus, the receiver 202 is enabled to communicate the received mobile device location information 206 and the received mobile device identification information 210 with the memory device 228 and/or the processor 212, such that the received mobile device location information 206 and/or the mobile device identification information 210 may be stored at the memory device 228 and/or accessed by the processor 212.

The memory device 228, in one embodiment, stores process instructions (e.g., machine-readable code, such as computer software) for implementing methods executed by the processor 212, as well as data that processor 212 generates or processes such as credit card offers, as will be discussed herein. The memory device 228 includes the memory store 215. The memory device 228 may include one or more tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices.

The memory store 214 is configured for storing at least portions of any of the following types of information: mobile device customer information 216; location information 218; brand information 220; presentation option information 222; and conversion factors 224. In one embodiment, the memory store 214 stores all of the foregoing types of information. In another embodiment, portions of the memory device 228 (other than the memory store 214) may store portions of the foregoing type of information as well. Of note, the presentation option information 222 is a collection of rules either designed by the brand of interest or the service 114, in which the method of presenting the credit card offer on the display screen of the mobile device 102 is predetermined to correlate with other characteristics found to be matching between the identified customer and the business establishments.

The processor 212 is configured for executing various methods described by process instructions stored at the memory device 228. For example, in one embodiment, the processor 212 is configured for accessing the received mobile device location information 206 and the received mobile device identification information 210. The processor 212 accesses the received mobile device location information 206 and the received mobile device identification information 210 from the receiver 202 and/or the memory device 228. In one embodiment, the accessing of the mobile device location information 204 is executed by the mobile device location information accessor 302, which includes the set of process instructions described herein. In another embodiment, the accessing of the mobile device identification information 208 is executed by the mobile device identification accessor 304, which includes the set of process instructions described herein.

The processor 212 is further configured for determining a location of the mobile device 102, based on the received mobile device location information 206. For example, the processor 212 compares the received mobile device location information 206 with the stored location information 218 (i.e., forms of stored location information [e.g., maps of an area(s), names of businesses within an area, names of streets connecting businesses, maps of the interior of a business establishment, etc.]). When the processor 212 finds a match, in that the received mobile device location information 206 is found to be the same or nearly the same as portions of the stored location information 218, the processor 212 is able to determine the exact or nearly exact location of the mobile device 102, and hence the location of the consumer 100 (or potential customer) holding the mobile device 102. In one embodiment, the determination of the location of the mobile device is executed by the mobile device location determiner 306, which includes the set of process instructions described herein. The term, "nearly exact", in the context of the nearly exact location, refers to a location that is very close to the location of the mobile device 102 such that it can be determined approximately where the mobile device 102 is such that the mobile device 102 is seen in relation to the business establishments within the area of the mobile device. In one embodiment the nearly exact location may be with a couple of feet of the actual location of the mobile device to within a couple hundred yards of the actual location of the mobile device. The nearly exact location must be provide useful information to the geo-filtering system 104 such that the consumer is provided information (credit card offers) that is relevant to the consumer's location. For example, in one embodiment, it wouldn't be useful for the consumer to learn of a credit card offer for a business establishment that isn't within walking distance of the consumer. However, in another embodiment, a credit card offer for a business establishment that is within driving distance of the location of the consumer is found to be useful to the consumer. In one embodiment, the consumer is able to adjust the nearly exact location ranges. In another embodiment, the nearly exact location range is a predetermined default range determined by the service 114 and/or the business establishment.

In another example, the processor 212 compares the received mobile device identification information 210 with the mobile device customer information 216 stored at the memory device 228. Based on the received mobile device location information 204, an embodiment identifies a customer. The mobile device customer information 216 is information that includes a set of mobile devices (one or more mobile devices) being correlated with a set of registered owners (one or more consumers). For example, a mobile device M is registered with a Darlene Haverport. Thus, an embodiment determines that the mobile device M correlates with Darlene Haverport. Therefore, an embodiment identifies the customer, Darlene Haverport, as correlating to the mobile device M. Darlene Haverport is identified as the customer. In one embodiment, the identification of the customer from the mobile device identification information is executed by the customer identifier 308, which includes the set of process instructions described herein.

The processor 212 is further configured for determining a brand of interest for which one or more credit offers will be communicated to the identified customer. The determination of the brand of interest is based on the determined location of the mobile device 102, the stored location information 218, the identified customer (for example, Darlene Haverport mentioned above) and the stored customer information relating to the identified customer. The brand of the brand of interest is the business establishment that is relevant to the interest of the identified customer. The business establishment is enabled to distribute or have distributed credit cards which are "branded" with the business establishment's name. A term commonly used in the industry to describe the branded credit card is a "private label credit card". As described above, the customer has already opted-in to receive possible credit card offers from business establishments that may interest the customer. The customer received from the service 114 and answered questions relating to the customer, such as, but not limited to, the customer's demographic information. In one embodiment, the determination of the brand of interest is executed by the brand of interest determiner 310, which includes the set of process instructions described herein.

The processor 212 is further configured for comparing the following types of information stored at the memory device 228: a brand policy of the brand of interest (that is stored at the memory device 228 as part of the brand information 220), the stored customer mobile device customer information relating to the identified customer (that is stored at the memory device 228 as part of the mobile device customer information 216), the stored location information relating to the determined location of the mobile device 102 (that is stored at the memory device 228 as part of the location information 218) and the credit card offer conversion factors 224. The credit card offer conversion factors 224 assign values to combinations of subsets of information of at least any of the following types of information: a brand policy; stored customer information relating to the mobile device 102; and stored location information relating to the location of the identified customer. The credit card offer conversion factors 224 originate at the business establishment and are part of the business establishments' policies (brand policies) that govern whether or not a credit card offer should be presented to the identified customer. For example, and as described herein, the business establishment may require the following: if at least two characteristics of the business match at least two characteristics of the identified customer, then a credit card offer with a particular credit card limit should be presented to the identified customer. In this case, the value assigned to the characteristic of the business establishment that matches a characteristic of the identified customer is a value of "1". Each matching characteristic may receive "1" point. If two points are obtained when a comparison is performed, then it is determined that a credit card offer is to be extended to the identified customer. In another embodiment, a first combination of a first particular subset of business establishment characteristics matching an identified customer's characteristics is assigned a first value, a second combination of a second particular subset of business establishment characteristics matching an identified customer's characteristics is assigned a second value, and a third combination of a third particular subset of business establishment characteristics matching an identified customer's characteristics is assigned a third value. Some of the characteristics of the first, second, and third subset are the same. However, some of the characteristics of the first, second, and third subset are different. For example, a brand policy for "Express Dance" states that only if the third value is three times that of the first value and two times that of the second value should a credit card offer be generated for the identified customer.

As can be seen, the business establishment may assign any value to any subset of characteristics (wherein the subset of characteristics may be one or more characteristics). Essentially, these values that are assigned convert the matched characteristics or combination of matched characteristics into a numerical result that may be compared with a business establishment policy and/or other numerical results. In one embodiment, the comparing of the brand policy of the brand of interest, the stored customer information relating to the identified customer, the stored location information relating to the determined location of the mobile device 102 and the credit offer conversion factors is executed by the comparer 312, which includes the set of processing instructions described herein.

The processor 212 is further configured for generating a credit card offer to be transmitted to the identified customer. For example, but not limited to such, in one embodiment, the generation of the credit card offer includes a generation of the credit card limit for the credit card. In another embodiment, a credit card offer and a credit card limit is found to have been previously generated for the identified customer; as such, the generation of the credit card offer is merely a restatement of the credit card offer that is pending. In another embodiment, the previously generated credit card offer is updated to be a different credit card offer than that which was previously generated. In one embodiment, the generating of the credit card offer is executed by the credit card offer generator 314, which includes the set of processing instructions described herein.

It should be noted, that in one embodiment, if, during the filtering process, an existing credit card is found to be assigned to the customer, the information (i.e., credit limit, etc.) associated with the existing credit card account is communicated to the customer, in addition to, a credit card offer.

The transmitter 226 is configured for transmitting the credit card offer to the identified customer.

In one embodiment, the processor 212 of the geo-filtering system 104 is further configured for sending the credit card offer, which is to be transmitted to the identified customer, to the transmitter. In one embodiment, the sending of the credit card offer is executed by the credit card offer sender 318, which includes the set of processing instructions described herein.

Examples presented herein discuss embodiments in terms of including a mobile phone as the mobile device 102. However, it should be appreciated that the mobile device 102 may be a device that is not a mobile phone. FIG. 1 also shows a geofencing area 108 and antenna towers 110A, 110B, 110C and 110n... (hereinafter, "antenna towers 110", unless specifically noted otherwise). The geofencing area 108 is a predetermined geofenced area, for which location information is stored at the memory store 214 or the memory device 228 that is accessible to the service 114 and/or the mobile device 102. The antenna towers 110 function in conjunction with localization technology, as is known in the art. Of note, other embodiments may function with a geofencing area 108.

The service 114 is a business that arranges for the method described herein to occur, such as: securing the contracts/agreements with the phone carrier 112 for which the phone carrier 112 provides location information and/or alerts to the service 114 and/or mobile device 102 when the mobile device 102 is near particular clients (e.g., business establishments that have contracted with the service 114 [e.g. retail stores 116, 118, 120 and 122]), securing contracts/agreements with the client (i.e., business establishment(s)), and securing contracts/agreements with the consumer 100 (e.g., opting-in to receiving credit card offers). In one embodiment, the following is accessible to the service 114 and/or resides at the service 114: a processor 212; a memory device 228; a receiver 202; and a transmitter 226; and in one embodiment, a geofencing messaging system. Of note, in one embodiment, the phone carrier 112 specifically agrees to recognize when the mobile device 102 (that was pinged according to a prearranged contract with the service 114) is within a certain geofenced area, and then send an alert to the service 114, which includes the specific geofenced area. In another embodiment, the service 114 determines which geofenced area includes the determined location information. The service 114 accomplishes this, via the geofencing messaging system, by analyzing the xy coordinates of the determined location information and comparing them to the xy coordinate information stored at the memory device 228.

The processor 212 is configured for executing the methods described herein at least with regard to the geo-filtering system 104 and the geo-filtering module 106. The processor 212 functioning may be implemented, for example, by one or more discrete modules (or data processing components) that are not limited to any particular hardware, firmware, or software (i.e., machine readable instructions) configuration. The processor 212 functioning may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

FIG. 3 depicts a block diagram that illustrates the geo-filtering module 106, according to an embodiment. The geo-filtering module 106 includes the following modules whose functions have been described herein: the mobile device location information accessor 302; the mobile device identification accessor 304; the mobile device location determiner 306; the customer identifier 308; the brand of interest determiner 310; the comparer 312; the credit card offer generator 314. The geo-filtering module 106 optionally further includes any of the following: the credit card offer sender 318.

Example Methods of Operation

The following discussion sets forth in detail some example methods of operation of embodiments. With reference to FIGS. 1-4, a flow diagram of method 400 for geo-filtering consumers illustrates an example procedure used by various embodiments. Method 400 includes some procedures that, in various embodiments, are carried out by a processor under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware).

The following discussion of method 400 references FIGS. 1-4 unless specifically noted otherwise.

Figure 4:
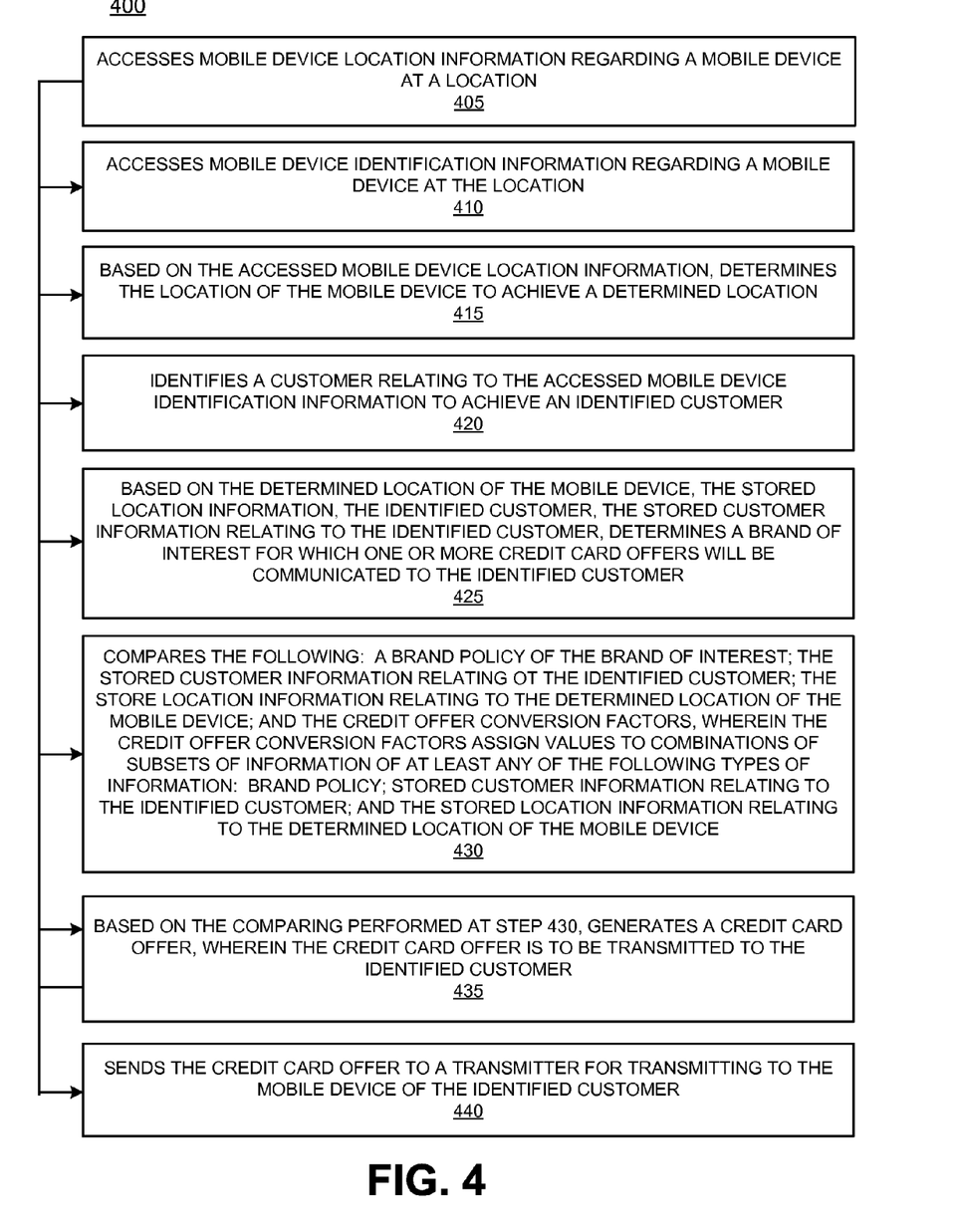
FIG. 4 depicts a flow diagram for a method for geo-filtering consumers, in accordance with an embodiment.

At step 405 of method 400, in one embodiment and as described herein, mobile device location information 205 regarding a mobile device 102 at a location is accessed, to achieve an accessed mobile device location information 320.

At step 410 of method 400, in one embodiment and as described herein, the mobile device identification information 208 regarding the mobile device 102 at the location is accessed, to achieve an accessed mobile device identification information 322.

At step 415 of method 400, in one embodiment and as described herein, based on the accessed mobile device location information 320, the location of the mobile device 102 is determined, to achieve a determined location 324.

At step 420 of 400, in one embodiment and as described herein, a customer relating to the accessed mobile device identification information 322 is identified to achieve an identified customer.

At step 425 of method 400, in one embodiment and as described herein, based on the determined location 324 of the mobile device 102, the stored location information 218, the identified customer 326, the stored customer information 216 relating to the identified customer 326, a brand of interest 328 is determined, for which one or more credit card offers will be communicated to the identified customer 326.

At step 430 of method 400, in one embodiment and as described herein, the following are compared: a brand policy of the brand of interest 328; the stored customer information 216 relating to the identified customer 326; the store location information 218 relating to the determined location 324 of the mobile device 102; and the credit offer conversion factors. The credit offer conversion factors assign values to combinations of subsets of information of at least any of the following types of information: brand policy; stored customer information 216 relating to the identified customer 326; and stored location information 218 relating to the determined location 324 of the mobile device 102.

At step 435 of method 400, in one embodiment and as described herein, based on the comparing performed at step 430, a credit card offer 330 is generated, wherein the credit card offer 330 is to be transmitted to the identified customer 326. In one embodiment, the credit card offer 330 includes a credit card limit. In one embodiment, the credit card offer 330 is one that has already been generated for the identified customer 326. In another embodiment, the credit card offer 330 that has already been generated for the identified customer 326 is updated, wherein the update is different from the originally generated credit card offer 330.

At step 440 of method 400, in one embodiment and as described herein, the credit card offer 330 is sent to the transmitter 226 for transmitting to the mobile device 102 of the identified customer 326.

Example Computer System

Figure 5:
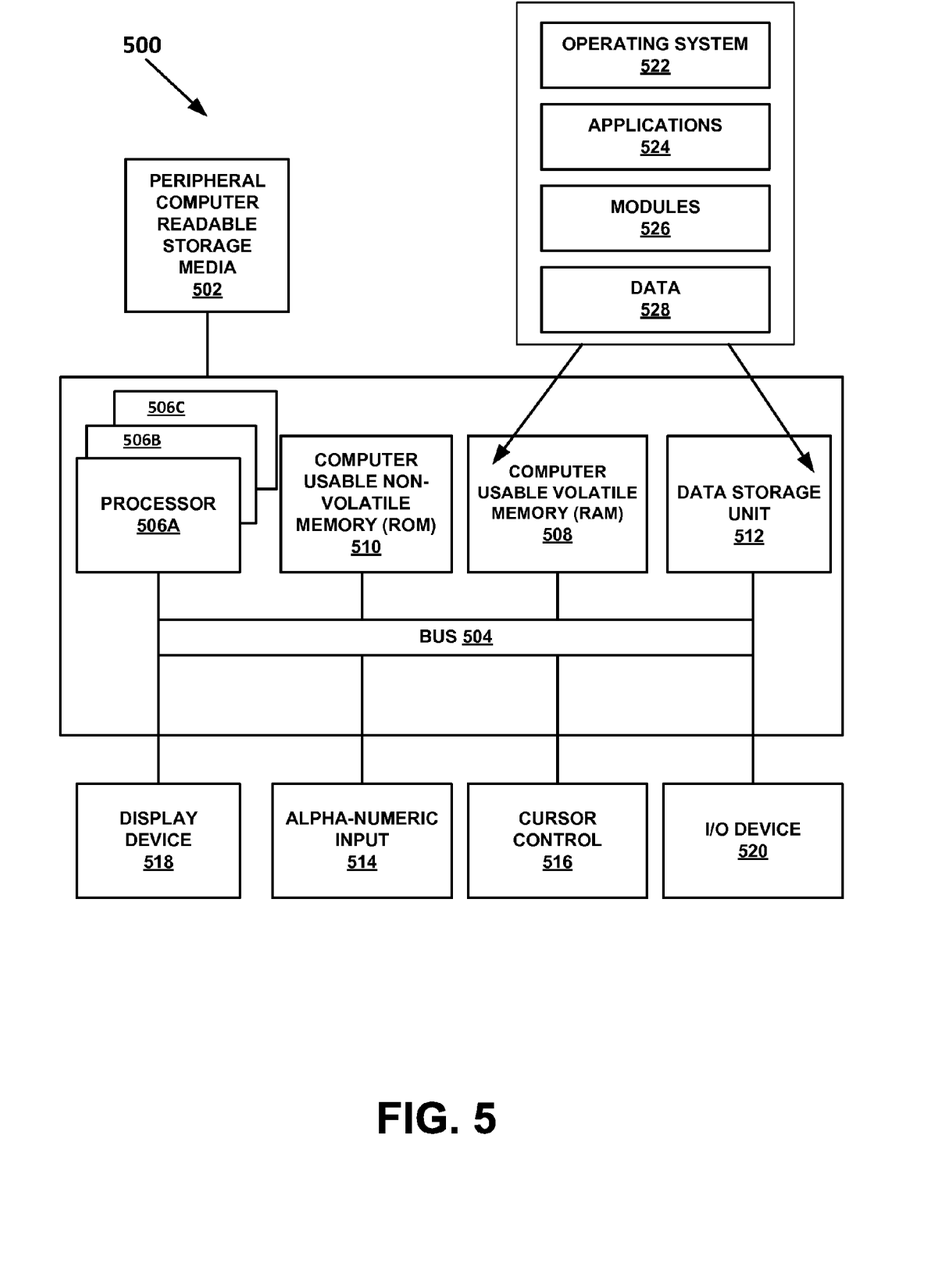
FIG. 5 is a block diagram of an example computer system with which or upon which various embodiments of the present invention may be implemented.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein. It is appreciated that computer system 500 of FIG. 5 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multi-media devices, and the like. Computer system 500 of FIG. 5 is well adapted to having peripheral non-transitory computer-readable storage media 502 such as, for example, a floppy disk, a compact disc, digital versatile disc, other disc based storage, universal serial bus "thumb" drive, removable memory card, and the like coupled thereto.

System 500 of FIG. 4 includes an address/data bus 504 for communicating information, and a processor 506A coupled with bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors, and may be the processor 212 described with respect to FIGS. 2 and 3. System 500 also includes data storage features such as a computer usable volatile memory 508, e.g., random access memory (RAM), coupled with bus 504 for storing information and instructions for processors 506A, 506B, and 506C.

System 500 also includes computer usable non-volatile memory 510, e.g., read only memory (ROM), coupled with bus 504 for storing static information and instructions for processors 506A, 506B, and 506C. In one embodiment, the memory device 524 of FIGS. 2 and 3 is an example the computer usable volatile memory 508 and/or the computer usable non-volatile memory 510. Also present in system 500 is a data storage unit 512 (e.g., a magnetic or optical disk and disk drive) coupled with bus 504 for storing information and instructions. System 500 also includes an optional alphanumeric input device 514 including alphanumeric and function keys coupled with bus 504 for communicating information and command selections to processor 506A or processors 506A, 506B, and 506C. System 500 also includes an optional cursor control device 516 coupled with bus 504 for communicating user input information and command selections to processor 506A or processors 506A, 506B, and 506C. In one embodiment, system 500 also includes an optional display device 518 coupled with bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer-readable storage media.

What I claim is:

1. A computing device comprising: one or more processors to:
   access a mobile device location information regarding a mobile device at a location to achieve the accessed mobile device location information, the accessed mobile device location information obtained by the mobile device via a network-based location system provided by a service provider of said mobile device;
   access a mobile device identification information regarding said mobile device at said location to achieve the accessed mobile device identification information;
   determine, based on said accessed mobile device location information and said accessed mobile device identification information, said location of said mobile device to achieve a determined location;
   create a plurality of geofences for a plurality of retailers to achieve a plurality of retailer geofences;
   compare said determined location with a database containing said plurality of retailer geofences;
   identify a retailer geofence, from said plurality of the retailer geofences, within which said mobile device is located to achieve an identified retailer geofence;
   identify a customer relating to said accessed mobile device identification information to achieve an identified customer;
   determine, based on said determined location of said mobile device, said identified retailer geofence, said identified customer, and a stored customer information relating to said identified customer, a brand of interest for which one or more credit card offers will be communicated to said identified customer, the one or more credit card offers being offers for one or more new credit card accounts;
   compare a brand policy of said brand of interest, said stored customer information relating to said identified customer, said identified retailer geofence relating to said determined location of said mobile device and credit offer conversion factors, wherein said credit offer conversion factors assign values to combinations of subsets of information of at least any of the following types of information:
   said brand policy;
   the stored customer information relating to said identified customer; and
   said identified retailer geofence relating to said determined location of said mobile device; and
   generate, based on said comparison, a credit card offer to be transmitted to said identified customer, the credit card offer being an offer for a new credit card account.

2. The computing device of claim 1, where the one or more processors are further to:
   send said credit card offer to a transmitter for transmitting to said mobile device of said identified customer.

3. The computing device of claim 1, where the one or more processors are further to:
   generate a credit card offer to be transmitted to said identified customer, wherein said credit card offer comprises a credit card limit.

4. The computing device of claim 3, where the one or more processors are further to:
  generate a credit card offer to be transmitted to said identified customer, wherein said credit card offer is based on an already generated credit card offer with a credit card limit for said identified customer for said brand of interest.

5. The computing device of claim 4, where the one or more processors are further to:
  update said already generated credit card offer.

6. A non-transitory computer-readable medium storing instructions, the instructions comprising:
  one or more instructions that, when executed by one or more processors, cause the one or more processors to:
  access mobile device location information regarding a mobile device at a location, the mobile device location information obtained by the mobile device via a network-based location system provided by a service provider of said mobile device; access the mobile device identification information regarding said mobile device at said location;
  determine, based on the mobile device location information, said location of said mobile device to achieve a determined location of said mobile device;
  create a plurality of pre-defined geofences for a plurality of retailers to achieve a plurality of retailer geofences;
  compare said determined location with a database containing the plurality of retailer geofences;
  identify a retailer geofence, from said plurality of retailer geofences, within which said mobile device is located to achieve an identified retailer geofence;
  identify, based on the accessed mobile device identification information, a customer from said mobile device identification information to achieve an identified customer;
  determine, based on said determined location of said mobile device, said identified customer, said identified retailer geofence, and stored customer information relating to said identified customer, a brand of interest for which one or more credit offers will be communicated to said customer, the one or more credit offers being offers for one or more new credit card accounts;
  compare a brand policy of said brand of interest, said stored customer information relating to said identified customer, said identified retailer geofence relating to said determined location of said mobile device and credit offer conversion factors, wherein said credit offer conversion factors assign values to combinations of subsets of information of at least any of the following types of information:
  said brand policy;
  said stored customer information relating to said identified customer; and
  said identified retailer geofence relating to said location of said mobile device; and
  generate, based on said comparison, a credit card offer to be transmitted to said customer, the credit card offer being an offer for a new credit card account.

7. The non-transitory computer-readable medium of claim 6, where the one or more instructions, when executed by the one or more processors, further cause the one or more processors to:
  send said credit card offer to a transmitter for transmitting to said mobile device.

8. The non-transitory computer-readable medium of claim 6, where the one or more instructions, when executed by the one or more processors, cause the one or more processors to:
  generate a credit card offer to be transmitted to said customer, wherein said credit card offer comprises a credit card limit.

9. The non-transitory computer-readable medium of claim 6, where the one or more instructions, when executed by the one or more processors, cause the one or more processors to:
  update an already generated credit card offer having a credit card limit, wherein said already generated credit card offer is for said customer for said brand of interest.

10. A geo-filtering system comprising:
  a receiver configured for receiving a mobile device location information regarding a mobile device at a location and a mobile device identification information regarding said mobile device at said location, the received mobile device location information obtained by the mobile device via a network-based location system provided by a service provider of said mobile device;
  a memory configured for storing:
  mobile device customer information; location information;
  brand information;
  presentation option information; and conversion factors;
  a processor configured for:
  accessing the received mobile device location information and the received mobile device identification information;
  determining a location of said mobile device, based on said received mobile device location information, to achieve a determined location;
  creating a plurality of geofences for a plurality of retailers to achieve a plurality of retailer geofences;
  comparing said determined location with a database containing the plurality of retailer geofences;
  identifying a retailer geofence, from said plurality of retailer geofences, within which said mobile device is located to achieve an identified retailer geofence;
  identifying a customer, based on said received mobile device identification information, to achieve an identified customer;
  based on said determined location of said mobile device, said identified retailer geofence, said identified customer and stored customer information relating to said identified customer, determining a brand of interest for which one or more credit offers will be communicated to said identified customer, the one or more credit offers being offers for one or more new credit card accounts;
  comparing a brand policy of said brand of interest stored as said brand information, stored mobile device customer information relating to said identified customer, said identified retailer geofence relating to said determined location of said mobile device and credit card offer conversion factors, wherein said credit card offer conversion factors assign values to combinations of subsets of information of at least any of the following types of information: said brand policy;
  said stored customer information relating to said mobile device; and
  said identified retailer geofence relating to said location of said identified customer; and
  based on said comparing, generating a credit card offer to be transmitted to said identified customer, the credit card offer being an offer for a new credit card account; and
  a transmitter configured for transmitting said credit card offer to said identified customer.

11. The geo-filtering system of claim 10, wherein said processor is further configured for:

sending said credit card offer, which is to be transmitted to said identified customer, to said transmitter.

12. The geo-filtering system of claim 10, wherein said generating a credit card offer to be transmitted to said identified customer comprises:
generating a credit card offer to be transmitted to said identified customer, wherein said credit card offer comprises a credit card limit.

13. The geo-filtering system of claim 10, wherein said generating a credit card offer to be transmitted to said identified customer comprises:
generating a credit card offer to be transmitted to said identified customer, wherein said credit card offer is based on an already generated credit card offer with a credit card limit for said identified customer for said brand of interest.

14. The geo-filtering system of claim 13, wherein said generating a credit card offer to be transmitted to said identified customer, wherein said credit card offer is based on an already generated credit card offer with a credit card limit for said identified customer for said brand of interest comprises:
updating said already generated credit card offer.

* * * * *